US010690363B2

(12) United States Patent
Coogan et al.

(10) Patent No.: US 10,690,363 B2
(45) Date of Patent: Jun. 23, 2020

(54) MINIMIZATION OF FAN POWER IN AIR DISTRIBUTION OR EXTRACTION

(71) Applicant: Siemens Industry, Inc., Alpharetta, GA (US)

(72) Inventors: James J. Coogan, Des Plaines, IL (US); Scott Johnson, Plymouth, MN (US); Paul Fuson, Prospect Heights, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 308 days.

(21) Appl. No.: 15/887,428

(22) Filed: Feb. 2, 2018

(65) Prior Publication Data

US 2019/0242601 A1 Aug. 8, 2019

(51) Int. Cl.
F24F 11/00 (2018.01)
F04D 27/00 (2006.01)
F24F 11/63 (2018.01)
F24F 11/77 (2018.01)
F24F 11/74 (2018.01)
F24F 7/06 (2006.01)
G01F 1/44 (2006.01)
G05D 7/06 (2006.01)
F24F 110/40 (2018.01)

(52) U.S. Cl.
CPC ........ F24F 11/0001 (2013.01); F04D 27/001 (2013.01); F04D 27/003 (2013.01); F04D 27/004 (2013.01); F24F 7/06 (2013.01); F24F 11/63 (2018.01); F24F 11/74 (2018.01); F24F 11/77 (2018.01); G01F 1/44 (2013.01); G05D 7/0676 (2013.01); F24F 2110/40 (2018.01)

(58) Field of Classification Search
CPC .......... F24F 11/001; F24F 11/77; F24F 11/63; F24F 11/74
USPC ........... 454/253, 229, 237; 236/49.1, DIG. 9
See application file for complete search history.

(56) References Cited

U.S. PATENT DOCUMENTS 7,024,258 B2    4/2006  Ahmed et al.
2009/0247064 A1*  10/2009  Chen .................. F24F 11/77
                                                        454/239

FOREIGN PATENT DOCUMENTS

EP    2660527 A1    11/2013

OTHER PUBLICATIONS

Kimla, John. "Optimized Fan Control in Variable Air Volume HVAC Systems Using Static Pressure Resets: Strategy Selection and Savings Analysis". Thesis. Texas A&M University. Dec. 2009 (Year: 2009).*
PCT Search Report dated May 21, 2019, for PCT Application No. PCT/US2019/017048, 15 pages.

* cited by examiner

Primary Examiner — Vivek K Shirsat

(57) ABSTRACT

For air distribution or extraction, fan speed is controlled using modeling to account for venturi air valves. A minimum pressure for each venturi air valve is incorporated into the model. The pressure losses for various duct airpaths to terminal units is calculated based, in part, on the minimum pressure of any venturi valve. The fan set point or operation is established based on the highest needed pressure in the various airpaths connected with the fan.

15 Claims, 3 Drawing Sheets

MINIMIZATION OF FAN POWER IN AIR DISTRIBUTION OR EXTRACTION

TECHNICAL FIELD

The present embodiments relate generally to air distribution or extraction systems.

BACKGROUND

Fan controls for variable air flow systems with multiple terminals waste energy if the variable air flow systems do not turn down the fan speed to the lowest speed that satisfies the various terminals. Fan control systems are designed to find that lowest speed. Systems that are not optimized run faster, consuming excess energy, or run too slow and fail to satisfy the terminals.

To minimize fan power, some systems collect data from the terminal controllers. The data indicates the state of the flow controller (e.g., the position command to the flow control damper). The fan controller adjusts fan speed or duct pressure to get at least one damper close to open. Other systems evaluate sufficiency of the fan output in each terminal controller, determining if the flow controller is satisfied or not, and indicating the level of satisfaction to the fan controller. The satisfaction is usually a binary signal or discrete signal expressing several levels of satisfaction. Other systems use flow setpoint values from the terminals and a duct model to calculate the pressure necessary to satisfy the terminals. None of these approaches applies to a system that uses a venturi air valve as a flow control device. The first two approaches rely on knowing the position of the adjustable obstruction to air flow. In a venturi air valve, the cone moves on a shaft, independent of the control system. The position may not directly relate to needed fan speed or pressure. For the model approach, the existing models do not represent the venturi valve.

For systems with a venturi valve, a pressure sensor (or switch) measures the pressure across the venturi valve to determine if the pressure is sufficient. This measurement is used to control fan speed, but requires a significant investment in additional pressure transmitters (e.g., switches), wiring, and programming for each venturi valve, along with the added burden to periodically recalibrate each of those pressure indicating devices.

SUMMARY

For air distribution or extraction, fan speed is controlled using modeling to account for venturi air valves. A minimum pressure for each venturi air valve is incorporated into the model. The pressure losses for air paths to and including various duct branches or terminal units is calculated based, in part, on the minimum pressure of any venturi valve. The fan set point or operation is established based on the highest needed pressure in the air paths to various branches connected with the fan.

In a first aspect, a control system is provided for air movement. An air-handling unit (AHU) includes an AHU fan and is configured to distribute or draw air. A terminal unit connects with the AHU by a duct for receiving or providing the air from or to the AHU. A venturi air valve is in the duct or terminal unit. A controller is configured to set a set point of the AHU fan based on a coefficient of pressure loss of the duct, a flow rate of the air in the duct for the terminal unit, and a minimum operating pressure of the venturi air valve. The AHU fan operates based on the set point.

In a second aspect, a system is provided for air distribution or extraction. An air-handling unit (AHU) has an AHU fan. A duct fluidly connects the AHU to one or more terminals. A venturi valve connects with the duct. A controller is configured to model pressure in the duct. The model of the pressure in the duct includes a minimum pressure for operation of the venturi valve. The AHU fan is configured to be controlled as a function of the pressure calculated by the model.

In a third aspect, a method is provided for minimizing fan power use in an air distribution or extraction system. An airflow for each of a plurality of terminal units is received. The pressure loss for a path from the AHU to the terminal is modeled for each of the terminal units based on the respective air flow and venturi valve minimum operating pressure. A fan is controlled as a function of the pressure losses calculated from the terminals.

Other systems, methods, and/or features of the present embodiments will become apparent to one with skill in the art upon examination of the following FIGS. and detailed description. It is intended that all such additional systems, methods, features, and advantages be included within this description, be within the scope of the invention, and be protected by the accompanying claims. Additional features of the disclosed embodiments are described in, and will be apparent from, the following detailed description and the FIGS.

BRIEF DESCRIPTION OF THE FIGURES

The components in the FIGS. are not necessarily to scale, emphasis instead being placed upon illustrating the principles of the embodiments. In the FIGS., like reference numerals designate corresponding parts throughout the different views.

DESCRIPTION OF SOME EMBODIMENTS

In a variable air volume system, the fan power use for air distribution or extraction is minimized. A duct system model is used to calculate the required pressure. This model represents the operation of one or more venturi air valves in the duct system in conjunction with representing the other flow passages. The pressure calculated using the representation of the venturi air valves results in an inherently stable pressure control point and facilitates targeted actions to resolve rogue terminals.

Physical tests of the system as built are incorporated into the model. The values of parameters of the model are based on the physical tests of the as-built, mechanical system. Default or standard values may be used. The tests and modeling process are specifically adapted to the action of a venturi air valve. The behavior of the valve is accounted for by the model.

Figure 1:
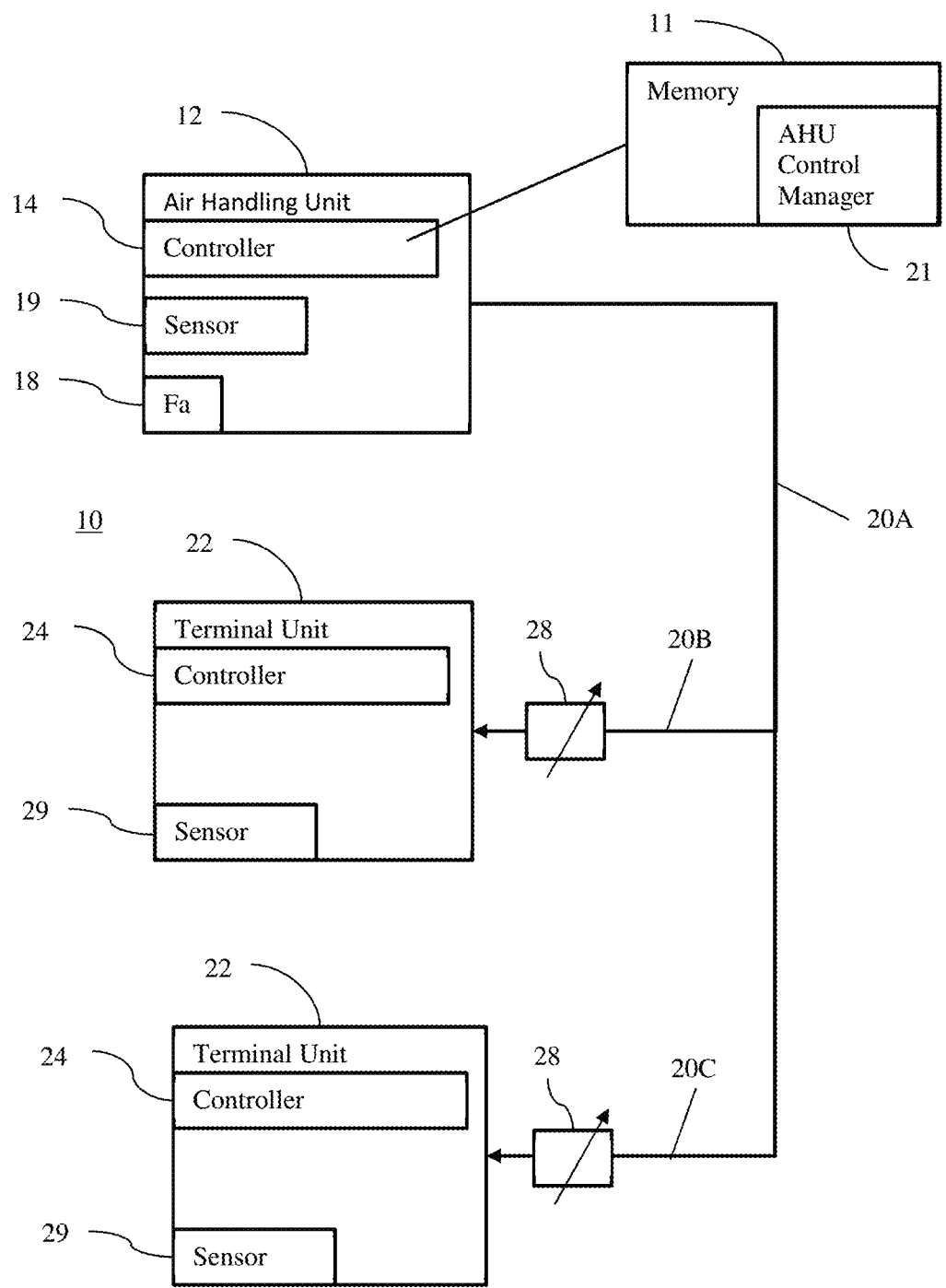
FIG. 1 is a block diagram of one embodiment of a system for air distribution or extraction.

FIG. 1 shows one embodiment of a system 10 for air distribution or extraction. The system 10 optimizes energy consumption by minimizing fan speed while accounting for venturi air valves. For desired operation of the venturi air valve, a minimum pressure is needed. The modeling accounts for this minimum pressure.

Figure 5:
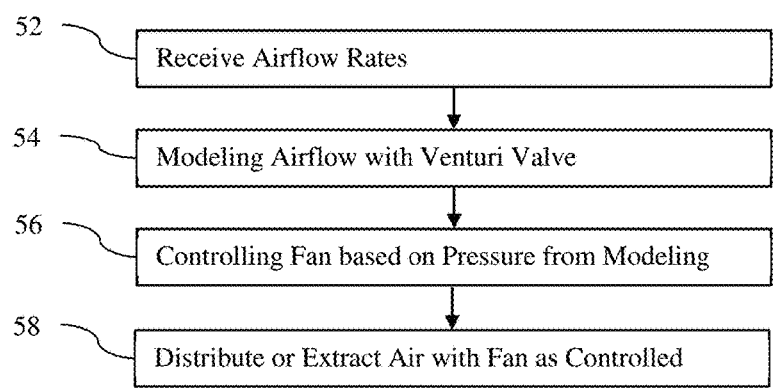
FIG. 5 is one embodiment of a method for minimizing fan power use in an air distribution or extraction system.

The system 10 implements the methods of FIG. 5. Other methods may be implemented in the control system.

The system 10 is a control system for air movement. Air is distributed to different terminals. For example, heated or cooled air (e.g., conditioned air) is provided to terminal units 22 for further conditioning and/or distribution to occupant or other spaces (e.g., a room). In another example, air is distributed to different rooms in a laboratory where one or more rooms are maintained at a negative pressure relative to other rooms. Alternatively, air is extracted from different terminals. For example, air is exhausted from one or more areas in manufacturing or a laboratory and drawn to the air handling unit (AHU) 12. In the examples below, air distribution is used.

The system 10 includes an AHU 12, a plurality of terminal units 22, and a network of ducts 20 interconnecting the AHU 12 with the terminal units 22 for air flow from the AHU 12 to the terminal units 22 or vice versa. Additional, different, or fewer components may be provided. For example, any number of terminal units 22 is provided, such as three or more (e.g., tens). As another example, a separate or remote computer or server is provided to integrate with the AHU 12 (such as to the controller 14 of the AHU 12) and/or the terminal units 22, and to calculate the settings and/or model pressure in the ducts 20. In yet another example, a wired and/or wireless communications network is provided for transmission of data from and/or between the AHU 12 and/or terminal units 22.

The AHU 12 may be any now known or later developed AHU for residential, industrial, laboratory, or office use. The AHU 12 may mix air from outside a building or supply air with return air from the spaces where the terminal units 22 are located, conditions the air, and then provides the conditioned air to the terminal units 22. For example, the AHU 12 filters and mixes air with or without heating or cooling and then provides the air to the terminal units 22. The AHU 12 may be a dedicated outside air system conditioning only outside air for supply to the terminal units. The AHU 12 is configured by operation of the fan 18, spin direction of a motor, control, and/or arrangement of parts to distribution or extract air.

The AHU 12 may include a return air input, fresh air input (i.e., receive air from outside), air mixing section, filters, one or more cooling coils, one or more heating coils, dampers or actuators, attenuator, discharge, one or more fans 18, and one or more sensors 19. Additional, different, or fewer components may be provided in the AHU 12. For example, the AHU 12 is a box with a damper, the fan 18, and filters, but without one or both of heating and cooling coils.

The fan 18 is any motor and blade(s) for forcing air to or from the ducts 20. Any blade may be used. Any motor may be used. In one embodiment, a variable drive, such as a variable frequency drive (VFD) that is operatively connected to the controller 14, controls the motor speed by adjusting frequency of the power to the motor. In response to a control signal, such as in response to a frequency, duty cycle, amplitude, or other signal characteristic, the motor controls the speed of the fan 18. An actuator may control a damper for increasing and/or decreasing the airflow. Alternatively or additionally, change in the speed of the fan 18 causes greater or lesser airflow. The rate of airflow controls the pressure of the air passing from the AHU 12 to the terminal units 22. The change in airflow by the fan 18 may be used to more closely regulate pressure and/or airflow downstream of the fan 18 in the air distribution or upstream of the fan 18 in air extraction.

The fan 18 is configured to be controlled. In one embodiment, the fan 18 is controlled to provide airflow at given pressure or amount (e.g., cfm). A set point is used to control the fan 18. A control routine uses the set point and pressure sensor to adjust the speed of the fan 18. Alternatively, other control arrangements are provided, such as controlling fan speed directly based other inputs.

The fan 18 is configured to be controlled as a function of pressure modeled by a model. The controller 14 models one or more pressures, such pressure loss at different branches 20B-E of the ducts 20. The pressures include representation of any venturi air valves 28. The set point for the fan 18 or other fan control is based, at least in part, on the pressures modeled by the model. For example, a highest pressure of the branches 20B-E to supply air to the respective terminal 22 is found, and the setpoint for the fan 18 is set based on this highest pressure.

The sensor 19 is for measuring pressure in the duct, usually near the fan 18. The sensor 19 is a pressure sensor, where flow rate is determined based on the pressure. In one embodiment, the sensor 19 is a flow rate sensor. The sensor 19 is positioned in an air duct 20 to measure the flow rate of air through the AHU 12, exiting the AHU 12, and/or over the heating and/or cooling coils. In another embodiment, the sensor 19 is a fan speed sensor, such as an optical sensor or encoder to measure rotation of the fan. In yet another embodiment, the sensor 19 is a strain gauge, contact, or other sensor to measure a position of a damper. Alternatively, the sensor 19 uses settings of the damper position and/or fan speed (e.g., duty cycle or frequency). Any sensor indicting the flow rate may be used, such as adding air flow rates through terminals.

The AHU 12 includes one or more controllers 14. The controller 14 is a field panel, processor, computer, application specific integrated circuit, field programmable gate array, analog circuit, digital circuit, and/or other controller. A single controller 14 is shown, but an arrangement of different controllers may be used. For example, different controllers are provided for different components (e.g., controller for the fan 18 different than the controller for the damper and/or controller for modeling). The distributed controllers may communicate for interactive control, may be controlled by a master controller, and/or may operate independent of other control.

A memory 11, such as a random-access memory (RAM), read only memory (ROM), removable media, flash, solid state, or other memory, stores instructions used by the controller 14. For example, the memory 11 is a non-transitory computer readable storage medium for storing instructions. When the physical controller 14 executes the instructions, the controls discussed herein are performed. For example, the memory 11 includes instructions for implementing the AHU control manager 21, which models pressures including representation of one or more venturi air valves and sets a set point of the fan 18 based on the modeled pressures. The memory 11 stores set points, sensor values, control information, and/or instructions for control by the controller 14. The stored data is used for controlling operation of the AHU 12, such as for modeling pressures at different branches of ducts and using the pressures to set a set point of the fan 18 for supplying air to the terminal units 22.

The terminal units 22 receive the conditioned air supplied by the AHU 12 via the ducts 20. The terminal units 22 may heat, cool, filter, control pressure, and/or adjust airflow of the air further. For example, the AHU 12 supplies air at 61 degrees. The set point for the air sent to the occupant space is 65 degrees, so the terminal unit 22 heats the supplied air to 65 degrees and then supplies the air to an occupant area or areas. As another example, the terminal unit 22 uses one or more dampers and/or fans to regulate airflow and/or pressure in the room based on control of the amount or rate of air provided into and taken out of the room. The terminal units 22 include one or more air outputs to one or more rooms. Alternatively, the terminal units 22 include one or more air inputs or exhaust hoods to receive air from one or more rooms.

The terminal units 22 may include dampers, controllers 24, heating coils, cooling coils, filters, fans, and/or sensors 29. Each terminal unit 22 is the same as the other terminal units 22 but arranged to condition air for different zones or rooms. Alternatively, the different terminal units 22 have different capacities, components, and/or capabilities. Similarly, the terminal units 22 are the same or different than the AHU 12, such as having the same components. The same or different types of components noted for the AHU 12 may be used for the terminal units 22.

Each of the terminal units 22 includes a flow rate sensor 29. The same or different type of flow rate sensors 29 as described for the sensor 19 are provided. The flow rate sensors 29 indicate the airflow to or from the terminal units 22. In one embodiment, a setpoint, such as a flow rate setpoint used to control a damper, is used as the measure of flowrate.

The duct 20 is metal tubing or another duct structure. The duct 20 connects the AHU 12 with the terminal units 22. This fluid connection is used to receive or provide air from or to the AHU 12 to or from the terminal units 22.

The duct 20 has any arrangement, such as trunk portions 20A from the AHU 12 to various branch portions 20B-C. The trunk portions 20A have a same or different cross-section as any of the branch portions 20B-C. The different branch portions 20B-C extend from a trunk portion 20A to connect with or terminate at the terminal units 22. There is one branch portion 20B-C for each terminal unit 22, but more than one branch portion 20B-C may connect with a given terminal unit 22. While one truck portion 20A is shown connected between the AHU 12 and the branch portions 20B-C, more than one trunk portion 20A may be used.

The venturi valves 28 connect with the duct 20. For example, the venturi valves 28 connect with the respective branch portions 20B-C between the trunk portion 20A and the terminal units 22. In other embodiments, the branch portions 20B-C terminate at the venturi valves 28, and the venturi valves 28 output directly to the terminal units 22. Alternatively, the venturi valves 28 are built into the terminal units 22. Different branch portions 20B-C and corresponding venturi valves 28 may use the same or different positioning. A venturi valve 28 is provided in each branch portion 20B-C in the example of FIG. 1, but one or more branch portions 20B-E may not include a venturi valve 28. More than one venturi valve 28 may be provided in any branch portion 20B-C, and a venturi valve 28 may or may not also be in the trunk portion 20A.

The venturi valves 28 are venturi air valves that provide desired air flow over a range of pressures given an airflow setpoint. The venturi valves 28 may more accurately or precisely control airflow or pressure than a damper. In one embodiment, a cone or parabola shape slides along a shaft to control air flow. One or more springs or elastic material position the cone along the shaft in response to changes in the available pressure drop at that duct location. The spring is fully extended when the pressure drop is less than the listed minimum operating value, and fully compressed when the pressure drop is greater than the listed maximum operating value. For pressures between the minimum and maximum, the spring/cone compensate for changes in available pressure drop to maintain a constant flow through the venturi. As pressure across the venturi decreases below the minimum operating pressure drop, the flow through the venturi changes as a quadratic function.

There is a minimum operating pressure corresponding to the start of compression or expansion of the spring. This minimum operating pressure may be measured, such as measured for a representative model. A default, such as a type standard, default, or manufacturer provided, minimum operating pressure is used. In alternative embodiments, the minimum pressure is measured in a field test. The venturi valve 28 as installed in the duct 20 or terminal unit 22 is operated to find the minimum pressure. Alternatively, airflow and pressure are measured at the terminal unit 22 and at the AHU 12 over a range of airflows and/or pressures, and the model of the pressures in the system 10 is solved to determine the minimum pressure of the venturi valves 28. The different venturi valves 28 have a same or different minimum pressure as other venturi valves 28.

The controller 14 of the AHU 12 is configured to control the fan 18 in a way to minimize power usage by the fan 18. Other controllers may be used, such as a separate server or computer (e.g., an HVAC workstation or panel) or a controller 24 of a terminal unit 22. The controller 14 is configured by software (e.g., instructions), hardware, and/or firmware to control the fan 18, such as by setting a setpoint for airflow, pressure, or speed, to minimize energy consumption while still providing enough airflow to satisfy load demand given losses in distribution or extraction.

The controller 14 is configured to gather or collect data from or for the AHU 12 and/or terminal units 22, such as from the sensors 19 and 29 and/or setpoints. The collected data is also for operation of the AHU 12 and/or may be gathered for other uses. The controller 14 receives the flow rates as the setpoints or from the AHU sensor 19 and the terminal unit sensors 29.

A push, pull, or look-up system may be used. In one embodiment, sensor readings or setpoints are provided regularly or stored in a table and updated if changed. The controller 14 accesses the sensor readings or setpoints from the local memory 11. Alternatively, the terminal units 12 are queried when sensor readings or setpoints are needed.

In one embodiment, the terminal units 22 and AHU 12 are grouped in a communications system using group data exchange. The communications rely on the group labeling, such as the sensor readings for group members being routed to or accessible by a group master. For example, the AHU 12 is a group master where the terminal units 22 are group members. Communications for other groups are not read or used, but communications providing sensor readings for the group are identified. Any header or group labeling may be used. Other communications systems, such as direct connect, bus, or response-query may be used.

The controller 14 is configured to model loss of pressure in the duct 20. The pressure in the trunk portion 20A and the different branch portions 20B-C is modeled. Air passing through the duct 20 is subject to friction, leaks, or obstruction, so loss of airflow in the duct 20 is accounted for in the modeling. The model determines the pressure for each trunk portion 20A and branch portion 20B-C of the duct 20. The pressure is a minimum pressure needed to overcome pressure loss, so the air path with a highest minimum pressure is found for controlling the fan 18.

In one embodiment, a square law pressure loss is modeled in every trunk portion 20A and branch portion 20B-C. The minimum pressure for each branch portion 20B-C is then the sum of pressures along each part of the path from the fan 18 to the terminal unit 22. The whole path through the trunk portion 20A to the room is represented by one loss coefficient, which is the sum of every loss between the trunk portion 20A and the room, including the variable loss coefficient in the terminal unit 22. Other pressure loss or models may be used.

Figure 2:
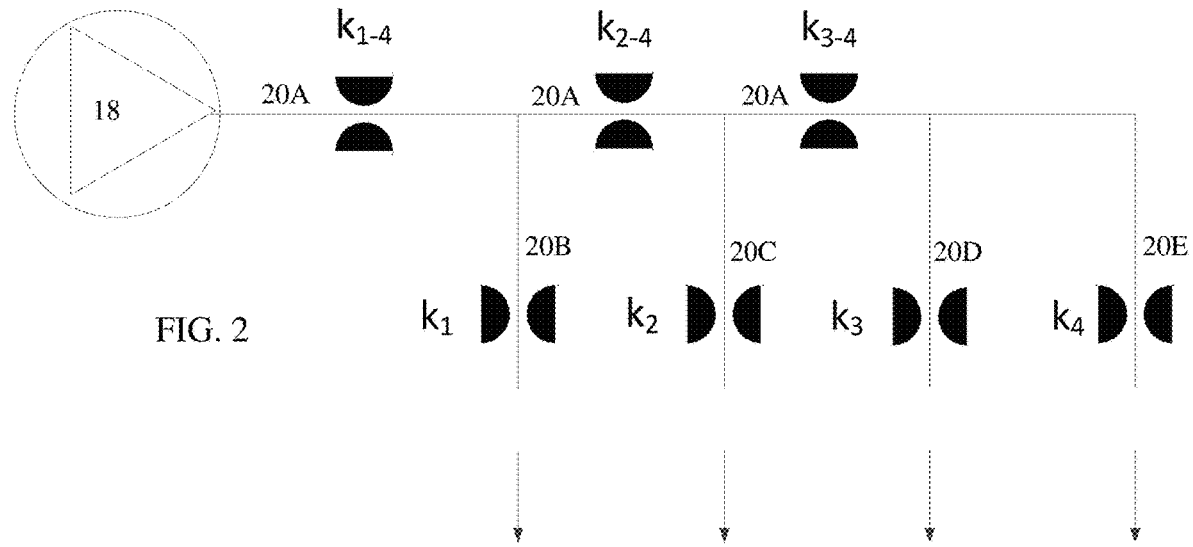
FIG. 2 illustrates modeling pressure requirements in an air distribution or extraction system.

FIG. 2 shows an example. Each trunk portion 20A and branch portion 20B-E has a coefficient of friction or pressure loss coefficient, k, resulting in loss. The different branch portions 20B-E are labeled with different subscripts 1 through 4 in this example. The trunk portions 20A use subscripts representing the branch portions 20B-E supplied by the trunk portion 20A. Using the square law pressure loss, the loss along each of the four air paths may be calculated as:

$$p = k_1 Q_1^2 + k_{1\text{-}4} Q_{1\text{-}4}^2$$

$$p = k_2 Q_2^2 + k_{1\text{-}4} Q_{1\text{-}4}^2 + k_{2\text{-}4} Q_{2\text{-}4}^2$$

$$p = k_3 Q_3^2 + k_{1\text{-}4} Q_{1\text{-}4}^2 + k_{2\text{-}4} Q_{2\text{-}4}^2 + k_{3\text{-}4} Q_{3\text{-}4}^2$$

$$p = k_4 Q_4^2 + k_{1\text{-}4} Q_{1\text{-}4}^2 + k_{2\text{-}4} Q_{2\text{-}4}^2 + k_{3\text{-}4} Q_{3\text{-}4}^2 + k_{4\text{-}4} Q_{4\text{-}4}^2$$

where p is pressure, and Q is the airflow. The airflow in each portion 20A-E is determined from the sensors 19, 29, such as using measured values or airflow set points for the branch portions 20B-E and a sum of associated branch measured values for trunk portions 20A.

In one embodiment, the model described in U.S. Pat. No. 7,024,258 is used. The pressure loss coefficients are determined by varying operation of the system (e.g., terminal units 22) and measuring pressure and airflow results. Default, standard, or other measured loss values may be used.

Where the duct 20 includes a venturi valve 28, the venturi valve 28 is to be represented in the model for loss of pressure. The minimum pressure of operation of the venturi valve 28 is accounted for in the modeling. The variable air volume system model is extended to cover the venturi valves 28. The pressure loss is modeled based on the coefficient of pressure loss of the duct, airflow of air in the duct, and the minimum pressure for operation of the venturi valve. The controller 14 is configured to determine an airpath or branch pressure for each of the branch portions 20B-E based, in part, on the minimum operating pressure of the respective venturi air valve 28. This representation for loss of pressure due to the venturi valve 28 is added for any locations with a venturi valve 28. Any branch portion 20B-E or trunk portion 20A without a venturi valve 28 is modeled without the venturi valve representation.

Figure 3:
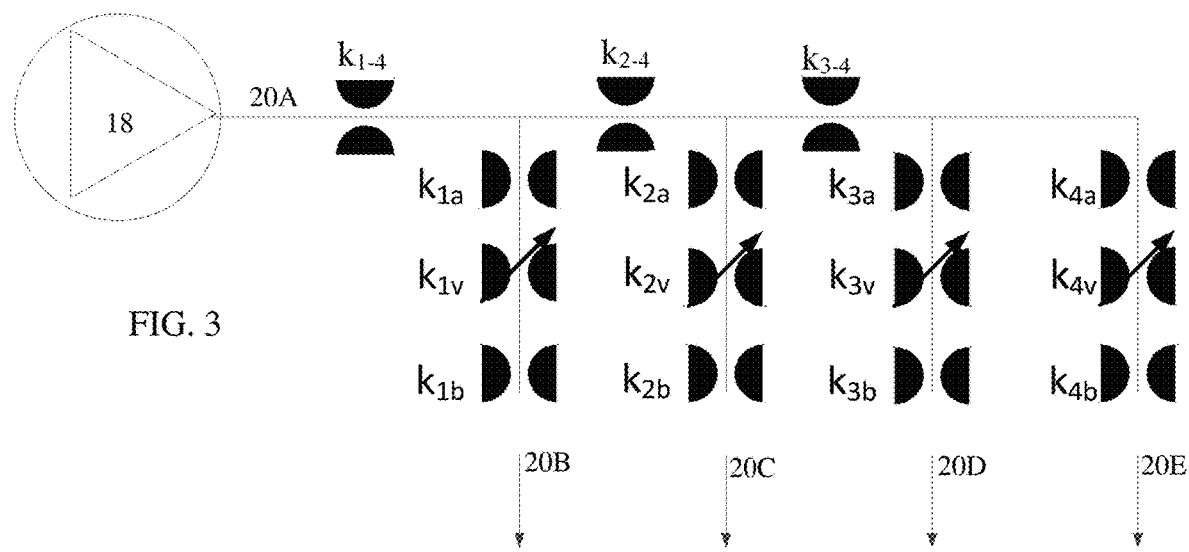
FIG. 3 illustrates one embodiment of modeling pressure requirements in an air distribution or extraction system with venturi valves in the duct branches.

FIG. 3 shows an example. The venturi valves 28 are in the branch portions 20B-E. Thus, the coefficient is divided into loss before the venturi valve 28 (e.g., $k_{1a}$), loss after the venturi valve (e.g., $k_{1b}$), and the loss of the venturi valve 28 (e.g., $k_{1v}$). The path from the trunk to the room is represented with three pressure losses in series: upstream, terminal or venturi valve 28, downstream relative to the venturi valve 28. The total pressure loss in the branch is the sum of the pressures for the three losses (e.g., loss times the square of airflow for each).

Figure 4:
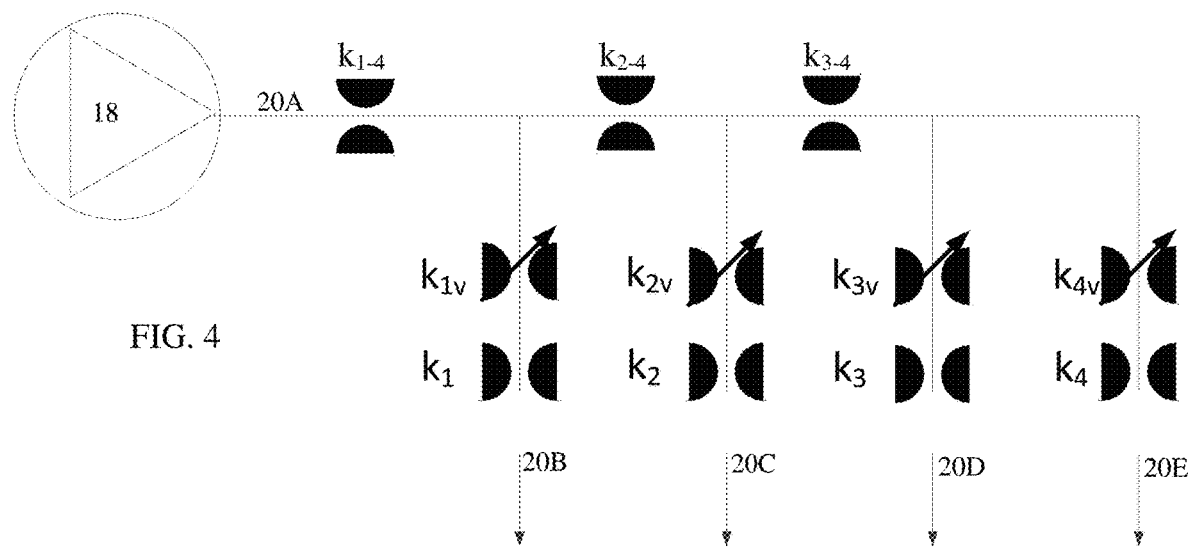
FIG. 4 illustrates another embodiment of modeling pressure requirements in an air distribution or extraction system with venturi valves in the duct branches.

FIG. 4 shows a further simplification in the model. The loss upstream of the venturi valve 28 and the loss downstream of the venturi valve 28 are combined. One coefficient is used for the entire branch portion 20B-E while keeping the loss associated with the venturi valve 28 separate. For each branch portion 20B-E with a venturi valve, there are two pressure losses. This simplification provides for the model of FIG. 2, except with the venturi valve 28 in series with the local branch portion 20B-E. The coefficients of pressure loss for the ducts 20 (e.g., not for the venturi valves 28) are determined by varying operation of the system (e.g., terminal units 22) and measuring pressure and airflow results. Default, standard, or other measured loss values may be used.

When the duct pressure is at minimum, the terminal unit 22 will be at setpoint with the loss across the venturi valve 28 at approximately the bottom of the venturi valve's 28 working pressure range (e.g., bottom of 0.3" or 0.6"). To find the pressure needed to drive the flow through each path to the terminal units 22, the equations for modeling loss above are used, but with the minimum pressure for the venturi valve 28 added to the paths with venturi valves 28. In the example of FIG. 4, the minimum pressure is added for each branch portion 20B-E. The resulting model is represented as:

$$p = k_1 Q_1^2 + k_{1\text{-}4} Q_{1\text{-}4}^2 + p_{min}$$

$$p = k_2 Q_2^2 + k_{1\text{-}4} Q_{1\text{-}4}^2 + k_{2\text{-}4} Q_{2\text{-}4}^2 + p_{min}$$

$$p = k_3 Q_3^2 + k_{1\text{-}4} Q_{1\text{-}4}^2 + k_{2\text{-}4} Q_{2\text{-}4}^2 + k_{3\text{-}4} Q_{3\text{-}4}^2 + p_{min}$$

$$p = k_4 Q_4^2 + k_{1\text{-}4} Q_{1\text{-}4}^2 + k_{2\text{-}4} Q_{2\text{-}4}^2 + k_{3\text{-}4} Q_{3\text{-}4}^2 + p_{min}$$

where $p_{min}$ is the minimum operating pressure of the venturi valve 28 (e.g., the pressure at which the spring or elastic portion of the venturi valve 28 begins to expand or contract). The model of pressure loss for each airpath through a branch portion 20B-E of the ducts 20 includes loss due to the loss through the ducts 20 of the path to the terminal unit 22 and pressure needed to operate the venturi valve 28. Other pressure loss or venturi valve model representations may be used. In alternative embodiments, the effects of the venturi valve are modeled in other ways than pressure loss, such as modeling the venturi valve with loss and airflow in a linear or non-linear relationship.

To control the fan 18, the controller 14 is configured to identify the branch portion 20B-E or terminal unit 22 having a highest pressure needed to overcome loss through the entire air path (e.g., branch portion 20B-E and any trunk portions 20A from the AHU 12 to the terminal unit 22). The branch air path with a highest value of the pressure calculated in the model is selected, resulting in selection of one of the branch portions 20B-E. The fan 18 is controlled based on this highest pressure loss of the air path. The fan 18 is to provide sufficient air flow so that the greatest pressure loss is just overcome. The pressure loss in the air paths to and including other branch portions 20B-E is less, so this control of the fan 18 provides sufficient pressure for all air paths to all the the branch portions 20B-E.

The controller 14 is configured to control the fan 18 by setting a setpoint. The setpoint for fan speed, airflow, and/or pressure is set to provide the desired airflow to the terminal units 22 while overcoming the greatest pressure loss of airpaths to and including the branch portions 20B-E. A look-up table is used to determine the value of a setting of the fan 18 based the total airflow and pressure loss. Alternatively, the value of the set point is increased or decreased as needed based on feedback measures in a control loop. The greatest pressure loss is used to determine an amount to add to the set point setting. In one embodiment, the fan speed is determined by a duct pressure control loop. The required pressure is calculated from the model and used as the setpoint for the control loop. Other fan controls accounting for the greatest pressure loss may be used. The controller 14 sets a set point of the AHU fan 18 based on coefficients of pressure loss of the different portions of the duct 20, flow rates of the air in the different portions of the duct for the terminal unit 22, and the minimum operating pressures of the venturi air valves.

The minimum fan speed, operation, or power usage that still provides the desired airflow for each branch with enough pressure to overcome the pressure loss in the branch with a greatest pressure loss is used to control the fan 18. The effects of the venturi valve 28 are used in this control, allowing for minimization of fan power while assuring operation of any venturi valves 28.

The minimization occurs in an on-going manner. Any time there is a change in load or airflow, the minimization is performed again. The fan set point may be determined upon a trigger, such as a change in another setting. A periodic check may be performed, such as determining the set point of the fan 18 periodically.

FIG. 5 shows one embodiment of a method for minimizing fan power use in an air distribution or extraction system. The flow rates of air in the different parts of the ducts 20 are used to determine pressure loss. The pressure loss to move air through the duct 20 for each terminal is used to control the fan 18. By modeling any venturi valves in the pressure loss, the fan 18 is controlled in a way to minimize power usage while providing sufficient pressure for moving the air and operating the venturi valves.

The method is implemented by the system of FIG. 1, the controller 14, a server, a computer, a panel, a workstation, or another device. For example, the controller 14 receives air flow rates from a communications interface or a memory. The controller 14 calculates the pressure losses to different terminals 22 and adjusts the setting for the AHU fan 18 based on the highest of the pressure losses.

The method is performed in the order shown or other order. For example, act 58 is performed while performing the other acts. Additional, different, or fewer acts may be provided. For example, acts for establishing the set points for the terminal load are provided. As another example, acts for controlling the fan 18 based on a setpoint are provided.

In act 52, the controller 52 receives measures or settings of airflow (e.g., amount of air supplied or extracted over unit time) for the terminals 22. The airflow at each terminal 22 is received. Airflow from other locations may be received, such as at the AHU 12.

Any measure of the airflow may be used. For example, the sensors 19, 29 measure operation of the air handling in the system. The controller 14 may collect or store other information, such as set points, to be used as indication of the airflow.

The measurements and/or other data are transmitted to the controller 14. The transmission is of any of the data at once or over time. The transmissions for later times may transmit just data that has changed. The transmission is wired or wireless. The transmission is direct or over a network. In one embodiment, the transmission is by access or looking up the data by the controller 14 in a memory. Any transmission format may be used. The transmission provides the airflow to be used by the controller 14 for modeling pressure loss.

In act 54, the controller 14 models terminal or airpath pressures for each of the terminals 22. The modeling is based on the respective airflows and venturi valve pressures. The coefficients for ducts 20 from the AHU 12 to the terminals 22 and airflows through the ducts 20 are used to calculate the pressure loss to provide air to each terminal 22. Where a venturi valve 28 is in the path to the terminal 22, a minimum operating pressure for the venturi valve 28 is included in the pressure loss model. Any model for pressure loss may be used.

The controller 14 determines the pressure loss through each path of the duct 20 to each of the terminals 22. The path with a highest or greatest pressure loss is identified. Alternatively, the highest or greatest pressure loss is identified.

In act 56, the controller 14 sets (e.g., establishes, adjusts or changes) a setpoint of the fan 18 of the AHU 12. The fan 18 is controlled as a function of the terminal or airpath pressures. The pressure losses from the model indicate a highest of the losses in pressure to provide air at the airflow to a terminal 22. The setpoint of the fan 18 is set to provide sufficient airflow to the terminal 22 given this highest pressure loss. The airflow to the terminals associated with lesser pressure losses will be sufficient. The airflow from the fan 18 is set to be just enough or at a tolerance over the airflow needed to overcome the greatest pressure loss to provide the demand flow, resulting in sufficient airflow to all terminals 22 but at a minimized or reduced power usage.

The setpoint is established based on the airflow requirements of the terminals. The pressure set point for fan control is the greatest of the calculated pressure losses based on the airflow requirement from each terminal. Alternatively, the setpoint is established based on the airflow for the terminals 22, and then the setpoint is adjusted by an empirically determined amount based on the amount of the greatest pressure loss with or without any excess pressure where a reserve capacity is to be provided. Other mappings of highest pressure loss to settings of the setpoint of the fan may be used. For a terminal whose airflow requirement must be able to change rapidly, faster than the controller and AHU can respond, excess pressure may be added to the highest pressure loss. Alternatively, the flow rates used to calculate the pressure losses of the air paths are increased by a default amount without actually increasing airflow setpoints to ensure reserve capacity. Sudden increases in flow are more likely dealt with having the reserve capacity.

In act 58, the air is distributed. The air is output by the AHU 12 using the fan 18. The fan 18 is controlled by the controller 14 based on the set point. The air moves through the duct 20 to the terminals 22, which output the air to the rooms or other spaces. The air is provided with sufficient airflow to overcome pressure loss and operate any venturi valves 28 while also providing the desired airflow to the terminals 22. Due to the modeling including the venturi valves 28, the pressure and airflow control by the venturi valves 22 is provided while reducing power usage of the fan 18 (i.e., fan 18 operated at a lower speed or set point while still providing sufficient airflow).

The air supplied by the AHU 12 is conditioned. The AHU 12 may filter, heat, or cool the air. The terminal units 22 may filter, heat, or cool the air.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A control system for air movement, the control system comprising:
   an air-handling unit (AHU) comprising an AHU fan, the AHU configured to distribute or draw air;
   a terminal unit connected with the AHU by a duct for receiving or providing the air from or to the AHU, wherein the terminal unit is one of a plurality of terminal units, and wherein the duct comprises a trunk portion and a plurality of branch portions, one branch portion of the branch portions for each of the terminal units;
   a venturi air valve in the duct or terminal unit; and
   a controller configured to set a set point of the AHU fan based on a pressure loss coefficient of the duct, a flow rate of the air in the duct for the terminal unit, and a minimum operating pressure of the venturi air valve, wherein the controller is configured to determine a branch pressure for each of the branch portions, an air path to and including the branch with the venturi valve having a highest air path pressure, and set the set point based on the highest air path pressure,
   wherein the AHU fan operates based on the set point.

2. The control system of claim 1 wherein the AHU is configured to distribute air to the terminal unit.

3. The control system of claim 1 wherein the AHU is configured to extract air from the terminal unit.

4. The control system of claim 1 wherein the venturi air valve comprises a spring, and wherein the minimum operating pressure corresponds to a pressure to start compression or expansion of the spring.

5. The control system of claim 1 wherein the minimum operating pressure is based on a characteristic for the venturi air valve.

6. The control system of claim 1 wherein the AHU includes the controller.

7. A control system for air movement, the control system comprising:
   an air-handling unit (AHU) comprising an AHU fan, the AHU configured to distribute or draw air;
   a terminal unit connected with the AHU by a duct for receiving or providing the air from or to the AHU, wherein the terminal unit is one of a plurality of terminal units, wherein the duct comprises a trunk portion and a plurality of branch portions, one branch portion of the branch portions for each of the terminal units;
   a venturi air valve in the duct or terminal unit, wherein the venturi air valve is one of a plurality of venturi air valves, one of the venturi air valves in the branch portion or respective terminal unit of each of the branch portions; and
   a controller configured to set a set point of the AHU fan based on a pressure loss coefficient of the duct, a flow rate of the air in the duct for the terminal unit, and a minimum operating pressure of the venturi air valve, wherein the controller is configured to determine an air path pressure for airpaths to and including each of the branch portions based on the minimum operating pressure of the respective venturi air valve and is configured to set the set point based on the a highest one of the air path pressures,
   wherein the AHU fan operates based on the set point.

8. The control system of claim 1 wherein the controller is configured to set the set point based on an air path pressure that is a function of the pressure loss coefficient of the branch portion of the duct, a flow rate of the air in the branch portion of the duct for the terminal unit, a minimum operating pressure of the venturi air valve, a pressure loss coefficient of the trunk portion, and a flow rate of the air in the trunk portion of the duct.

9. A system for air distribution or extraction, the system comprising:
   an air-handling unit (AHU) having an AHU fan;
   a duct fluidly connecting the AHU to one or more terminals;
   a venturi valve connected with the duct; and
   a controller configured to model pressure in the duct, the model of the pressure in the duct including a minimum pressure for operation of the venturi valve,
   wherein the duct includes first and second branches and a trunk, the terminal and venturi valve at the first branch,
   wherein the controller is configured to model the pressure for a first air path to and including the first branch of the duct, the pressure for the first air path including the minimum pressure for the operation of the venturi valve, and to model the pressure for a second air path to and including the second branch of the duct, and wherein the AHU fan is configured to be controlled based on a highest of the pressures for the first and second air paths from the model, and
   wherein the AHU fan is configured to be controlled as a function of the pressure modeled by the model.

10. The system of claim 9 wherein the controller is configured to set a set point of the AHU fan based on the pressure modeled by the model, and wherein the AHU fan is configured to be controlled as a function the set point.

11. The system of claim 9 wherein the venturi valve comprises a spring, and wherein the minimum pressure corresponds to a pressure to start compression or expansion of the spring.

12. The system of claim 9 wherein the minimum pressure is based on a field test of the duct.

13. The system of claim 9 wherein the controller is configured to model the pressure based on a coefficient of pressure loss of the duct, air flow of air in the duct, and the minimum pressure for operation of the venturi valve.

14. A method for minimizing fan power use in an air distribution or extraction system, the method comprising:
   receiving an airflow for each of a plurality of terminal units;
   modeling airpath pressures for each of the terminal units based on the respective air flows and venturi valve pressures, modeling airpath pressures comprising:
      modeling a pressure for a first air path to and including a first branch of a duct, the pressure for the first air path including a minimum pressure for an operation of a venturi valve; and
      modeling a pressure for a second air path to and including a second branch of the duct, wherein a fan is controlled based on a highest of the pressures for the first and second air paths; and
   controlling a fan as a function of the airpath pressures.

15. The method of claim 14 wherein modeling comprises modeling based on coefficients of pressure loss for ducts from an air handling unit to the terminal units.

* * * * *